United States Patent

Burger

[15] 3,688,205

[45] Aug. 29, 1972

[54] CIRCUIT ARRANGEMENT FOR THE COMPENSATION OF THE DIRECT CURRENT VOLTAGE DISTURBANCE COMPONENT OCCURRING IN THE THE DEMODULATION OF FREQUENCY-RE-SCANNED BINARY DATA SIGNALS

[72] Inventor: Erich Burger, Rossinistrasse 10, 8 Munich 23, Germany

[22] Filed: July 30, 1970

[21] Appl. No.: 59,545

[30] Foreign Application Priority Data

July 31, 1969 Germany..........P 19 39 067.1

[52] U.S. Cl. ..................329/132, 325/347, 325/474, 328/114, 329/104, 329/136, 329/192, 330/30 D, 330/69

[51] Int. Cl. ..............................................H03d 3/00

[58] Field of Search......329/131, 132, 110, 133, 134, 329/104, 136, 192; 325/347, 348, 474, 475, 476, 42; 330/30 D, 69, 138; 328/114

[56] References Cited

UNITED STATES PATENTS

| | | | |
|---|---|---|---|
| 3,427,560 | 2/1969 | Pincus | 330/69 |
| 3,449,677 | 6/1969 | Isaacs et al. | 329/104 X |
| 3,525,946 | 8/1970 | Grace | 329/110 |

*Primary Examiner*—Alfred L. Brody
*Attorney*—Birch, Swindler, McKie & Beckett

[57] ABSTRACT

A circuit arrangement for compensation of the direct current disturbance component in the demodulation of frequency modulated binary data signals is described. The discriminator output is coupled to a first input of two difference amplifiers. A limiter at the output of one of the difference amplifiers produces a correct d.c. signal, which signal is coupled to a second input of the other difference amplifier. A timing element couples the output of said other amplifier to a second input of said one difference amplifier.

4 Claims, 5 Drawing Figures

CIRCUIT ARRANGEMENT FOR THE COMPENSATION OF THE DIRECT CURRENT VOLTAGE DISTURBANCE COMPONENT OCCURRING IN THE THE DEMODULATION OF FREQUENCY-RE-SCANNED BINARY DATA SIGNALS

BACKGROUND OF THE INVENTION

The object of the invention is a circuit arrangement for the compensation of the direct current voltage disturbance component occuring in the demodulation of frequency re-scanned binary data signals due to a frequency disorder.

In the transmission of binary data signals (e.g., telegraph signals) with frequency modulation the peculiarity exists that in the demodulation distortions occur through frequency errors. Here generally frequency errors can be understood to be the deviating of the arithmetical mean of the received carrier frequencies for the separation current- and the signal current state from the mean frequency of the discriminator. Usually frequency errors are caused by temperature fluctuations, aging of the used components and other influencing of the frequency-determining elements.

If a frequency error occurs, this is emitted by the demodulator as a direct current voltage superimposed on the binary receiving data, the magnitude whereof depends on the deviation of the frequency received from the characteristic frequency of the demodulator.

In the case of a frequency error the alternating voltage-type form of the scanning within the linear part of the demodulation characteristic remains intact. A direct current voltage component which is dependent on the frequency error however, displaces, as additional voltage, the response threshold of the next following scanning stage. As the demodulated signals have an almost trapezoidal waveform, any deviation of the signals from the correct zero passages causes a one-sided distortion of the binary data steps.

Known circuit arrangements which operate on a demodulated signal change these distortions either through using AC coupling from the demodulator to the scanning stage or through a compensation of the occurring direct current voltage component with a control voltage which is obtained through rectification and filtering from the scanning signals. However, the permanent states do not remain thereby. The control range of the circuit approximately corresponds to the frequency change. After short interruptions of the received signal or a short circuit of the received signal, the circuits are no longer able to return into the control range.

It is an object of the invention to provide a circuit arrangement which possesses improved properties for the compensation of the occuring direct current voltage disturbance of component, compared to the known arrangements.

SUMMARY OF THE INVENTION

This object is attained in that the direct current voltage signal of the discriminator lies at the one input of a first difference amplifier and of a second difference amplifier, that after the first difference amplifier a limiter amplifier is switched, at the output whereof the corrected direct current voltage signal originates, that the corrected direct current voltage signal lies at the other input of the second difference amplifier, and that the output of the second difference amplifier is connected over a time element with the other input of the first difference amplifier.

The new circuit arrangement is able to retain the permanent states and to regulate them. The control range of the circuit is about 20 times the frequency shift. Within the control range the residual error and the distortion remain very low. The interception range of the circuit is about 90% of the control range. The cost for the arrangement is very low and it possesses a great stability against temperature fluctuations and component aging. Commercial circuit component stages, such as operation amplifiers, can be used.

The disturbance voltage immediately acts on the compensation circuit and not, as is the case in control circuits most of the time, that only after the control element, the control voltage is taken off. The circuit is suited not only for alternating current telegraphy with frequency modulation operation but also for duplex transmission with frequency modulation operation. The circuit can also be applied with advantage where heretofore, due to lack of stability in temperature, the demodulation of frequency re-scanned data was shifted from higher frequencies to a lower frequency position. Temperature deviations of a discriminator can also by compensated with the circuit.

The basic principle of the invention resides in the fact that a difference amplifier is employed as compensation circuit in which a control voltage is generated from the difference of the unlimited with the limited, demodulated signal. In a further difference amplifier the control voltage obtained is added to the demodulated signal in such a way, that through subtraction of the two voltages the frequency error is compensated.

BRIEF DESCRIPTION OF THE DRAWINGS

The invention will be best understood by referring to the description of a preferred embodiment given hereinbelow in conjunction with the drawings in which.

DETAILED DESCRIPTION OF THE DRAWINGS

Figure 1:
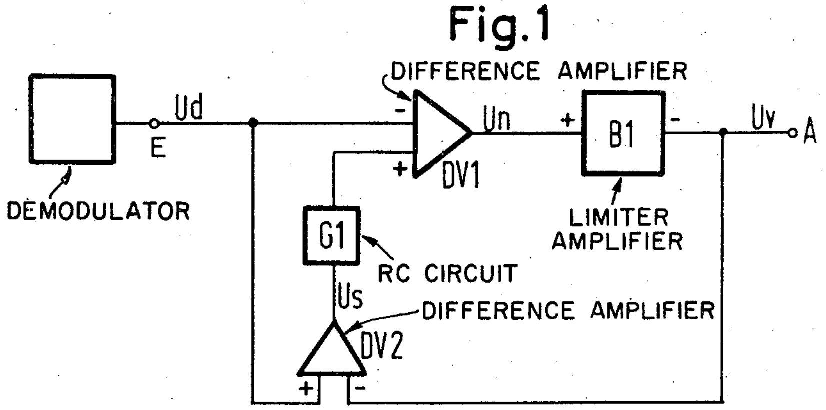
FIG. 1 is a block circuit diagram of a compensation circuit according to the invention in frequency modulated, alternating current operation.

At input E of the block circuit diagram in FIG. 1 lies discriminator outlet voltage Ud, which is composed of communication voltage Un and disturbance direct current voltage Us. At output A there results voltage Uv, which results through limiting of outlet signal Un of the first difference amplifier DV1. Voltage Uv is rendered steeper in its waveform in a subsequent scanning stage, so that the binary coded data are emitted with steep edges. With the aid of the second difference amplifier DV2 the disturbance direct current voltage Us is separated from discriminator outlet signal Ud.

Figure 3:
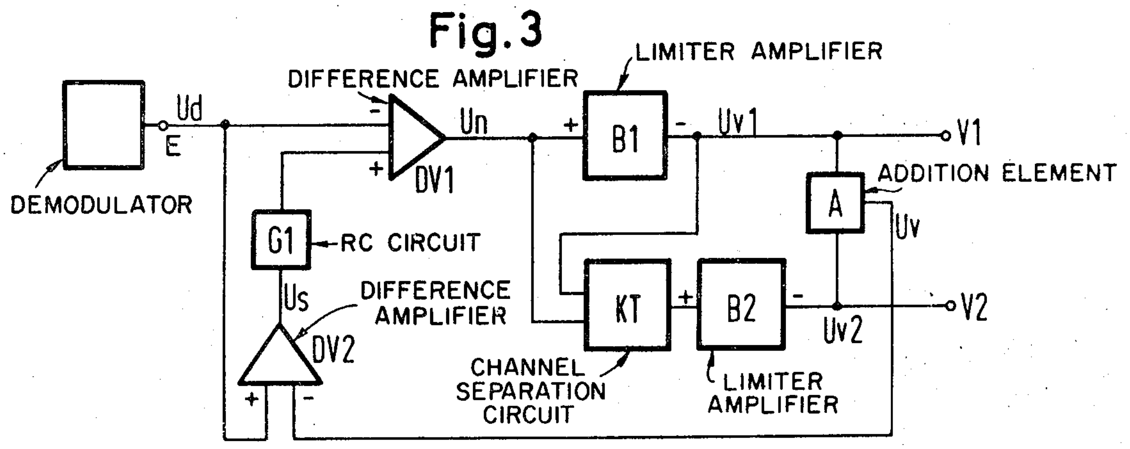
FIG. 3 is a block circuit diagram of a compensation circuit according to the invention in duplex transmission with frequency modulation.
Figure 5:
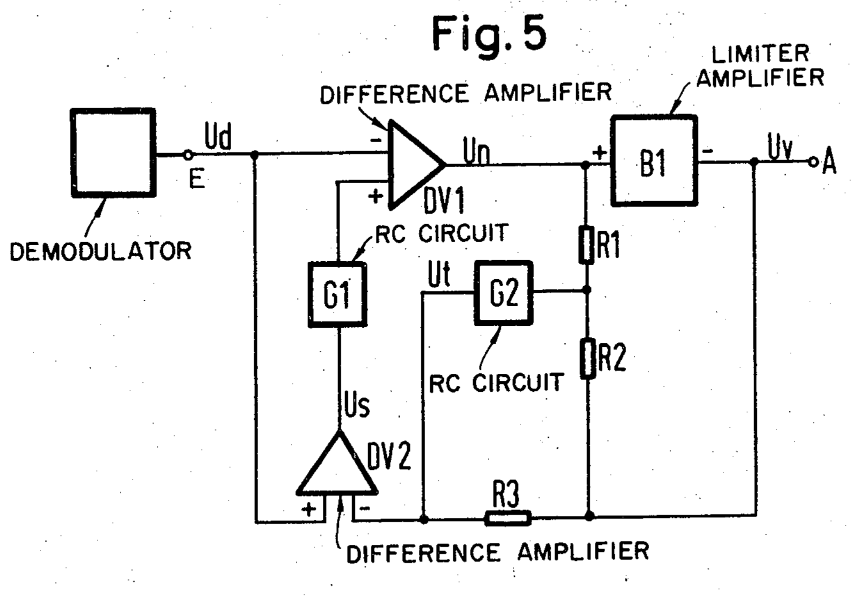
FIG. 5 is an alternative circuit arrangement according to the invention with additional stabilization.

Difference amplifier DV1 and DV2 are developed as operation amplifiers which are commercially available. In these circuits the two voltages are similarly positioned to each other in phase and amplitude. One of the two inputs in negated in the operation amplifier so that at the outlet the difference signal appears. In FIGS. 1, 3 and 5, in the employment of operation amplifiers as difference amplifiers, that input which negates the signal is marked by a minus sign. To achieve the correct mode of operation of the circuit it is then necessary that the output voltage of the limiter amplifier B1 is shifted in phase by 180°towards the input voltage.

Voltage Us at the same time controls, with the discriminator outlet voltage Ud, difference amplifier DV1. Through subtraction of Ud-Us, signal voltage Un results at the output of DV1, which is independent of frequency disorder, i.e., the direct current mean value of voltage Un is not displaced through a frequency displacement within the control range of the circuit. Output signal Uv of limited amplifier B1 lies at one input of the second difference amplifier DV2, and to the second input the discriminator output signal Ud is conveyed. As difference signal at the output of the second difference amplifier DV2, appears disturbance direct current voltage Us. For the purpose of balancing the control time, subsequently, in a time element G1 which is essentially developed as RC element, the disturbance direct current voltage is integrated. The integrated signal lies at the other inlet of the first difference amplifier DV1.

Figure 2:
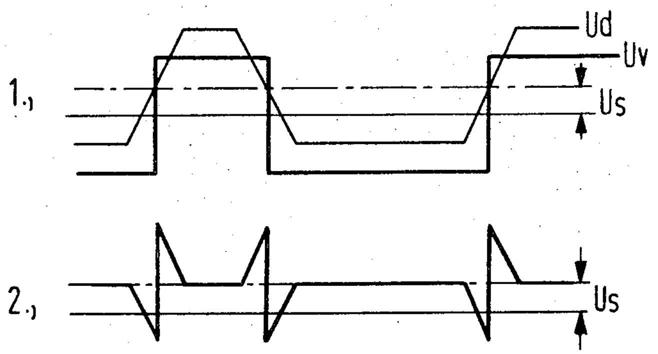
FIG. 2 shows in time diagram form the obtaining of the control voltage for FIG. 1.

FIG. 2 shows in time diagram the generation of the control voltage. Line 1 shows the discriminator output voltage Ud which possesses a trapezoid-like waveform, and the zero line whereof is displaced through a frequency error by the disturbance direct current voltage Us. The voltage waveform Uv results through amplification and delimitation of the output voltage of the first difference amplifier DV1. These two voltages lie at the two inputs of difference amplifier DV2. The difference signal is shown in line 2. Time element G1 regulates the peaks which occur, so that a constant direct current voltage Us results, which corresponds to the disturbance direct current voltage. In the first difference amplifier DV1 this is subtracted from the discriminator outlet voltage, so that the distortion caused by the frequency error is compensated.

FIG. 3 shows the block circuit diagram in duplex, frequency modulated operation. Such operation is understood to mean the simultaneous transmission of two independent binary coded communications in a single transmission channel, whereby in each case one of four re-scanning frequencies is transmitted. Each of the four frequencies characterizes a specific modulation condition of the two communications. On the receiving side the two messages are separated from each other with the aid of a channel separation circuit and are available at different lines.

The block circuit diagram in FIG. 3 corresponds to that in FIG. 1, except that in the first one the voltage Uv is the sum of the limited voltages Uv1 and Uv2. Uv1 and Uv2 represent the binary message signals of messages V1 and V2, freed from the disturbance direct current voltage. The signal before, as well as after limiter amplifier B1 is conveyed to a channel separation circuit KT. After limiter amplifier B1 the one communication V1 results, after limiter amplifier B2 which is switched after the channel separation circuit, the other communication, V2, results. Upon the addition of the two voltages in addition, element A, the two voltages Uv1 and Uv2 are added in a specific ratio, i.e., in such a way that voltage Uv1 possesses half the value of Uv2. In the simplest case addition element A consists of two resistors to which the two voltages are conveyed in the correct phase and amplitude. Through this addition the output signal of discriminator Ud is balanced, whereby here this is the linear duplex, frequency modulated signal. Then the sum signal is again compared in the second difference amplifier DV2 with voltage Ud. It must be observed thereby that the voltage amplitude of Uv must be equal to that of Ud; furthermore the two voltages must have an equal phase effect, as one inlet is negated in the difference amplifier. At the outlet of the second difference amplifier DV2, there then results again control voltage Us, which corresponds to the disturbance direct current voltage.

Figure 4:
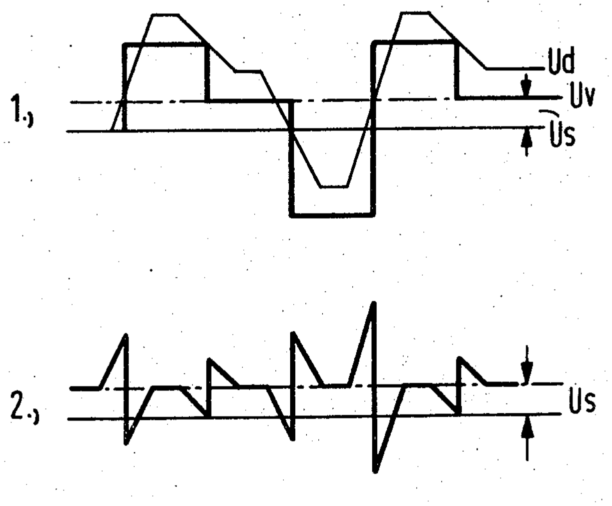
FIG. 4 shows in time diagram form the obtaining of the control voltage for FIG. 3.

FIG. 4 shows in a time diagram the control voltage generation. In line 1 Ud designates the discriminator outlet voltage. Due to a frequency error the zero line is thereby moved upwardly by the direct current voltage value Us. The output signal of the addition circuit A is designated Uv. In line 2 the outlet signal of the second difference amplifier DV2 is drawn in. Through the subsequently switched time element G1 the impulse peaks are integrated so that a constant direct current voltage Us results which corresponds to the disturbance direct current voltage and is subtracted in difference amplifier DV1 from the discriminator outlet voltage.

It is necessary for the circuit in FIG. 3 that in both communication paths no low pass filters are inserted before the addition circuit. Low pass filters to eliminate disturbance impulses are only inserted behind the addition circuit into the two communication paths V1 and V2.

As in FIG. 1, the difference amplifiers are commercially available operation amplifiers with one negated inlet. It is true for both circuits that the control signals at the difference amplifiers are small, so that good linearity and a wide control range are obtained. For the control time constant and for the stability of the circuit time element G1 is of importance. The time constant of element G1 is to be much higher than the build-up time of a single binary step of the communication, whereby here always the lowest occurring transmission speed forms the basis.

Through the employment of operation amplifiers as difference amplifiers the circuit possesses already good stability against temperature and component-changes. Through a simple supplement in the new circuit it is possible to obtain an arrangement having very good stability with regard to temperature fluctuations, component scattering, parallel course errors and other influences.

In FIG. 5 the block circuit diagram of FIG. 1 is shown. The improved stability is obtained through insertion of a negative feed-back into the control circuit. Communication voltage Un is composed of the actual communication voltage and a, for example, temperature-dependent voltage Ut. Through the formation of a difference of Un and Uv the temperature-dependent voltage Ut results. The subtraction is carried out over the two resistors R1 and R2, at which the two voltages lie. The outlet voltage of the limiter amplifier B1 is in opposite phase to its inlet voltage. The resistors must be dimensioned in such a way that the opposite-phase scanning signals cancel each other out in the amplitude. With time element G2 the voltage Ut is integrated, whereby the time constant of the time element is much higher than the build-up time of a binary data step. Now voltage Ut controls at the same time with the communication voltage Uv the second difference amplifiers DV2. Ut has effect over the second difference amplifier DV2 which for Ut, or Uv, turns the phase by 180°and over the first difference amplifier DV1 towards a change of Un. Resistor R3 serves to decouple the outlet of limiter amplifier B1 from the outlet of time element G2. After resistor R3 the high-ohm outlet voltage of time element G2 acts on the now also high-ohm outlet voltage of the limiter amplifier.

I claim:

1. Apparatus for compensating for the direct current voltage disturbance component occurring in the output of demodulating means for frequency modulated, binary data signals, comprising:

first difference amplifier means having first and second inputs with the output of said demodulating means being direct current coupled to said first input, first limiter means for receiving the output of said first amplifier and for producing therefrom a corrected direct current, demodulated signal, second difference amplifier means having first and second inputs, said first input being coupled to the output of said demodulating means and said second input being coupled to the output of said limiter means, and first integrating means coupling the output of said second amplifier to said second input of said first amplifier.

2. The apparatus defined in claim 1 wherein said integrating means comprises an RC circuit having a time constant greater than the rise time of a transmitted binary step at the lowest transmission speed.

3. The apparatus defined in claim 1, further comprising subtraction means having as inputs respectively, the input and output signals of said first limiter means and second integrating means coupling the output of said subtraction means to said second input of said second difference amplifier.

4. The apparatus defined in claim 1 further comprising:

channel separation circuit means for separating one of the messages in duplex, frequency modulated transmissions, said channel separation circuit means having inputs connected, respectively, to the input and output of said limiter means, addition means for receiving said one signal from said channel separation means and the other signal of said duplex transmission from said first limiter means and for producing an output signal coupled to said second input of said second difference amplifier, and second limiter means for producing a correct direct current output from said one separated signal.

* * * * *